(12) United States Patent
Prasad et al.

(10) Patent No.: US 11,854,039 B2
(45) Date of Patent: Dec. 26, 2023

(54) SYSTEM AND TECHNIQUES FOR AUTOMATIC RAPID BENEFIT DISTRIBUTION

(71) Applicant: Visa International Service Association, San Francisco, CA (US)

(72) Inventors: Ranjiva Prasad, Hampshire (GB); Jake Butler, London (GB); Nidhi Kapoor, London (GB)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/909,889

(22) PCT Filed: Jun. 29, 2020

(86) PCT No.: PCT/US2020/040090
§ 371 (c)(1),
(2) Date: Sep. 7, 2022

(87) PCT Pub. No.: WO2022/005446
PCT Pub. Date: Jan. 6, 2022

(65) Prior Publication Data
US 2023/0094519 A1    Mar. 30, 2023

(51) Int. Cl.
*G06Q 30/00* (2023.01)
*G06Q 30/0234* (2023.01)
(Continued)

(52) U.S. Cl.
CPC ........ *G06Q 30/0234* (2013.01); *G06Q 20/10* (2013.01); *G06Q 20/322* (2013.01); *G06Q 30/0215* (2013.01); *G06Q 30/0238* (2013.01)

(58) Field of Classification Search
None
See application file for complete search history.

(56) References Cited

U.S. PATENT DOCUMENTS

| 7,146,328 B1 | 12/2006 | Solomon et al. |
| 2005/0240473 A1* | 10/2005 | Ayers, Jr. .......... G06Q 30/0219 705/14.69 |

(Continued)

FOREIGN PATENT DOCUMENTS

| KR | 102061820 | 1/2020 |
| WO | 2019231758 | 12/2019 |

OTHER PUBLICATIONS

How to Edit Your Hosts File on Linux, Windows and macOS, Dec. 2, 2019, Linuxize.com (Year: 2019).*

(Continued)

*Primary Examiner* — Naresh Vig
(74) *Attorney, Agent, or Firm* — Kilpatrick Townsend & Stockton LLP

(57) ABSTRACT

Described herein are systems and techniques for providing automatic distribution of transaction-related benefits to an account used to conduct a transaction. In certain embodiments, the system receives transaction details from a transaction processing network as transactions are conducted. The system determines an appropriate benefit provider for a transaction conducted from an account and provides a subset of transaction details to that benefit provider. The benefit provider compares the subset of transaction details to a set of limited transaction details received from a resource provider to identify the transaction and determine a benefit amount, if any, for which the transaction qualifies. The benefit provider then provides the benefit amount to the system, which then causes the transaction processing network to credit the account the benefit amount.

19 Claims, 6 Drawing Sheets

(51) Int. Cl.
  *G06Q 20/10*   (2012.01)
  *G06Q 20/32*   (2012.01)
  *G06Q 30/0207* (2023.01)
  *G06Q 30/0238* (2023.01)

(56) References Cited

U.S. PATENT DOCUMENTS

| | | |
|---|---|---|
| 2011/0313901 A1 | 12/2011 | Kletzer |
| 2014/0108116 A1* | 4/2014 | Quinlan ................ G06Q 30/02 |
| | | 705/14.26 |
| 2014/0297307 A1 | 10/2014 | Pletz et al. |
| 2014/0365289 A1 | 12/2014 | Perreault et al. |
| 2015/0019314 A1 | 1/2015 | Salmon et al. |

OTHER PUBLICATIONS

Sid Lipsey published article "How to get your maximum VAT refund", Nov. 4, 2019, ThePointsGuy.com (Year: 2019).*
International Search Report and Written Opinion in No. PCT/US2020/040090, dated Mar. 26, 2021, 9 pages total.

\* cited by examiner

SYSTEM AND TECHNIQUES FOR AUTOMATIC RAPID BENEFIT DISTRIBUTION

CROSS-REFERENCE TO RELATED APPLICATION

This application is a National Stage of PCT application No. PCT/US2021/040090, filed Jun. 29, 2020, the disclosure of which is incorporated by reference herein in its entirety.

BACKGROUND

The distribution of benefits (e.g., rebates, discounts, tax exemption, etc.) to users for conducting particular transactions is often used by various entities (e.g., product manufacturers, government agencies, retailers, etc.) to drive user spending patterns. However, participating in benefit distribution can often be inefficient and cumbersome, which discourages many users from doing so, and reduces the efficacy of a benefit distribution system. By way of illustration, consider the following scenarios.

In a first scenario, an entity such as a manufacturer of goods or a government agency may wish to incentivize the purchase of particular products, regardless of from whom they are purchased. For example, a government agency may offer a rebate for purchasing an energy efficient version of a product. However, participation in this process may require that the purchaser fill out various forms with personal details that are physically mailed along with a receipt before an expiration date. Users may be discouraged by the length of the form or may forget to send the form before the expiration date.

In a second scenario, transactions conducted between resource providers in a particular region and users not resident to that region often include additional costs (e.g., taxes and fees) that the user should not be subject to. In these transactions, the user may be eligible to receive a reclamation (i.e., a reimbursement) of those additional costs. However, the process for making a reclamation claim can be complex and time consuming. Additionally, users may not be aware of certain requirements (such as reclamation eligibility rules for a particular location) at the time of purchase, which can result in those users becoming ineligible to make a reclamation request. Furthermore, users are often unaware of particular eligibility requirements for making reclamation requests when traveling. This is especially true when a user travels to multiple states or locales within a region and the eligibility rules vary across those locales.

Embodiments of the disclosure address these and other problems, individually and collectively.

SUMMARY

Embodiments described herein are directed to a system and techniques for automatic distribution of transaction-related benefits to an account used to conduct the transaction. In certain embodiments, the system receives transaction details from a transaction processing network as transactions are conducted. The system determines an appropriate benefit provider for a transaction conducted from an account and provides a subset of transaction details to that benefit provider. The benefit provider compares the subset of transaction details to a set of limited transaction details received from a resource provider to identify the transaction and determine a benefit amount, if any, for which the transaction qualifies. The benefit provider then provides the benefit amount to the system, which then causes the transaction processing network to credit the benefit amount to the account.

One embodiment is directed to a method performed by a benefit processor server comprising receiving transaction details related to a transaction conducted at a resource provider computer operated by a resource provider using a portable device of a user, identifying a benefit provider computer associated with the transaction, wherein the benefit provider computer independently receives limited transaction details for the transaction from the resource provider computer, providing a subset of the transaction details to the benefit provider computer, the subset of transaction details used by the benefit provider computer to identify the transaction, receiving, from the benefit provider computer, an indication of a value associated with the transaction, and transmitting a credit request message to an authorization entity computer to credit the value to an account associated with the portable device.

Another embodiment is directed to a benefit processor server comprising: a processor; and a memory including instructions that, when executed with the processor, cause the benefit processor server to, at least: receive transaction details related to a transaction conducted at a resource provider computer operated by a resource provider using a portable device of a user, identify a benefit provider computer associated with the transaction, wherein the benefit provider computer independently receives limited transaction details for the transaction from the resource provider computer, provide a subset of the transaction details to the benefit provider computer, the subset of transaction details used by the benefit provider computer to identify the transaction, receive, from the benefit provider computer, an indication of a value associated with the transaction, and transmit a credit request message to an authorization entity computer to credit the value to an account associated with the portable device.

These and other embodiments of the disclosure are described in further detail below.

DETAILED DESCRIPTION

Figure 1:
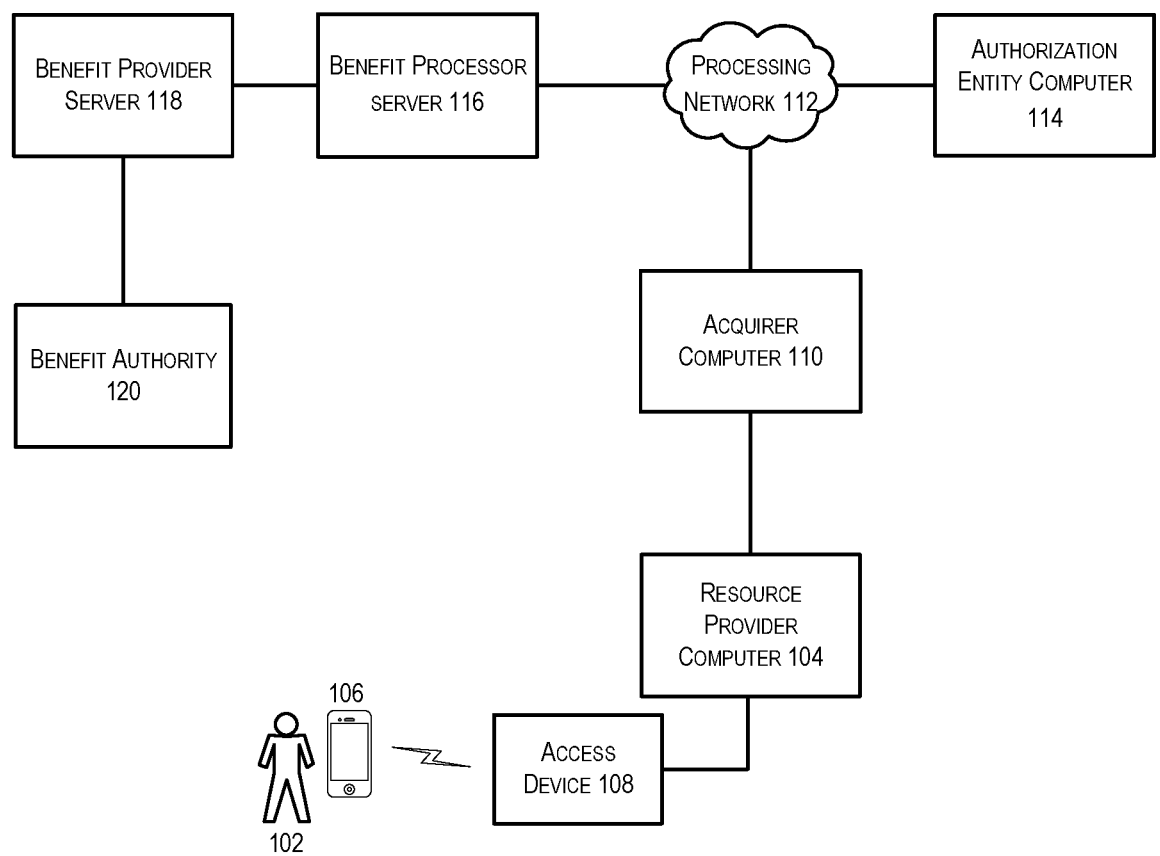
FIG. 1 depicts a block diagram illustrating an overview of an automatic benefit distribution system in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some embodiments, when a user conducts a transaction with a resource provider using an account maintained by an authorization entity, that resource provider generates an authorization request message to complete the transaction, that it sends to a transaction processing network. The transaction processing network then processes the authorization request message by routing it to the authorization entity which maintains the account. A benefit processor server receives transaction details from the transaction processing network as the transaction processing network processes authorization request messages. The benefit processor server then, independent of the authorization process, determines eligibility for various benefits. If the benefit processor server determines that the transaction qualifies for one or more benefits, then the benefit processor server transmits a subset of transaction details to a benefit provider associated with the qualifying benefit. The benefit provider is then able to match the subset of transaction details to limited transaction details provided by a resource provider in order to identify the transaction and determine a benefit amount. The benefit amount is then provided by the benefit provider back to the benefit processor computer. The benefit processor computer then transmits a credit request message to the transaction processing network, which is routed to the authorization entity, and the account is credited the determined benefit amount.

Prior to discussing the details of some embodiments of the present disclosure, description of some terms may be helpful in understanding the various embodiments.

"A portable device" may be any suitable device that is operated by a user that is portable, and can communicate with external entities such as access devices. Examples of user devices include cards that data stored on them, mobile phones, laptop computers, transponders, wearable devices such as smart watches, automobiles with remote communication capabilities, access cards, smart media, etc. A payment device may be an example of a portable device.

A "payment device" may include a device that may be used to conduct a financial transaction, such as to provide payment information to a merchant. A payment device may be in any suitable form. For example, suitable payment devices can be hand-held and compact so that they can fit into a user's wallet and/or pocket (e.g., pocket-sized). They may include smart cards, magnetic stripe cards, keychain devices, etc. If the payment device is in the form of a debit, credit, or smartcard, the payment device may also optionally have features such as magnetic stripes. Such devices can operate in either a contact or contactless mode.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource providers access device (e.g. POS equipment) that indicates approval of the transaction.

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user. An issuer may also issue account credentials stored on a portable device, such as a cellular telephone, smart card, tablet, or laptop to the user. In some embodiments, the authorization entity may be a server operated by a transaction processing network on behalf of an issuer. For example, the transaction processing network may maintain stand-in-processing (STIP) rules that are enforced by the transaction processing network to authorize requests when the issuer is unavailable.

A "benefit authority" may be any entity responsible for distributing a benefit related to, or reimbursing at least a portion of the value of, a transaction. In some embodiments, a benefit authority may be a government entity such as a customs organization or a tax authority. In some embodiments, a benefit authority may be a manufacturer or seller of a good.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction).

Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "service computer" or "service provider computer" may include any system associated with an entity that provides a resource or service. In some embodiments, the service computer may handle functionality of a computer application associated with the entity that provides the resource or service. The service computer may provide any suitable service. For example, the service computer may be a merchant, a utility company, a payment processing network, a wallet provider, a merchant, a website operator, or a bank.

A "transaction" may be any interaction or exchange between two or more parties. For example, a transaction may include a first entity requesting resources from a second entity. In this example, the transaction is completed when the resources are either provided to the first entity or the transaction is declined.

A "user" may include an individual. In some embodiments, a user may be associated with one or more personal accounts and/or mobile devices. The user may also be referred to as a cardholder, account holder, or consumer.

Details of some embodiments of the present disclosure will now be described in greater detail.

FIG. 1 depicts a block diagram illustrating an overview of an automatic benefit distribution system in accordance with at least some embodiments. In FIG. 1, a user 102 is able to conduct a transaction with a resource provider computer 104. In some embodiments, the transaction may be conducted via a portable device 106 and an access device 108 in communication with the resource provider computer 104. The resource provider computer 104 may be in further communication with an acquirer computer 110, configured to transmit authorization requests to a transaction processing network 112. In addition to processing the authorization request by forwarding it to an appropriate authorization entity 114, the processing network 112 may also provide a notification to a benefit processor environment (which includes at least one benefit processor server 116), which may, in turn, communicate with a benefit provider environment (which includes at least one benefit provider server 118).

The portable device 106 may be any device capable of capable of being used to conduct a transaction with a resource provider computer 104. In some embodiments, the portable device 106 may be a mobile device (e.g., a smart phone). The portable device 106 may be configured to communicate with a resource provider computer 104 via an access device 108, which may include contactless element. For example, the resource provider computer 104 may be a point of sale (POS) device that includes an access device 108 that is a contactless card reader. In some embodiments, the portable device 106 may include a mobile application that causes the portable device 106 to communicate with a benefit processor server 116.

A resource provider computer 104 may be any computing device operated by, or on behalf of, a resource provider. In some embodiments, a resource provider computer 104 may be configured to control access to one or more resources. For example, a resource provider may be a merchant or other seller of goods and/or services. In this example, the resource provider computer 104 may be a POS device (e.g., a cash register).

An acquirer computer 110 may be any computing device configured to conduct transactions on behalf of a resource provider computer 104. In some embodiments, transactions conducted by a number of resource provider computers 104 are handled by one or more acquirer computer 110. The acquirer computer 110 transmits an authorization request message for a transaction to an appropriate processing network 112. In some embodiments, an appropriate processing network 112 may be determined for a particular transaction by the acquirer computer 110 based on a network identifier included within payment information to be used to complete the transaction.

A transaction processing network 112 may be any set of computing devices that are configured to route authorization request messages to an appropriate authorization entity computer 114. In some embodiments, an appropriate authorization entity computer 114 may be determined for a particular transaction by the processing network 112 based on a network identifier included within payment information to be used to complete the transaction. In some embodiments, a transaction processing network 112 may additionally be configured to perform stand-in processing on behalf of an authorization entity computer 114. In addition to routing authorization request messages received from an acquirer computer 110 to an appropriate authorization entity computer 114, the processing network 112 may provide transaction details from the authorization request messages to a benefit processor server 116.

An authorization entity computer 114 may be any computing device operated by, or on behalf of, an authorization entity. In some embodiments, an authorization entity may be an issuer or other entity configured to authorize transactions. In some embodiments, the authorization entity may provide authentication for a portable device (e.g., a credit card).

The benefit processor server 116 may be any computing device capable of performing at least a portion of the functionality described herein. In some embodiments, the benefit processor server 116 may receive information related to transactions conducted at one or more resource provider computers 104. The benefit processor server 116 may identify any information included in the transaction information that pertains to potential benefit distribution, and in some cases, estimate an amount to be associated with the benefit. The benefit processor server 116 may be configured to track and compile benefit information for each transaction. In some embodiments, the benefit processor server 116 may be configured to generate and provide a notification to the portable device 106 upon determining that a transaction has been conducted by a user 102 of that portable device 106 that qualifies for a benefit. In some embodiments, the benefit processor server 116 may also be configured to generate, with respect to each transaction, a voucher that includes the benefit information for which it qualifies (e.g., for value-added tax (VAT) reclamation). Upon identifying a transaction which qualifies for a benefit, at least a portion of the details of the transaction are provided by the benefit processor server 116 to a benefit provider 118. Upon receiving confirmation of a benefit to be applied to a particular transaction, the benefit processor server 116 may be further configured to credit the confirmed benefit to a payment account used in the transaction. In some embodiments, the benefit processor server 116 may be operated by the same entity that operates the transaction processing network 112.

The benefit provider server 118 may be any computing device operated by an entity responsible for providing a particular transaction-related benefit. In some embodiments, a benefit provider may be a manufacturer of a good that offers a rebate for purchasing the good. In some embodiments, a benefit provider may be a tax reclamation provider which is responsible for distributing tax reclamations. In some embodiments, the benefit provider may manage distribution of benefits on behalf of a benefit authority (e.g., a government entity). By way of an illustrative example, the benefit provider 118 may be a manufacturer of energy-efficient products which qualify for a government rebate. In this example, the manufacturer may provide the government rebate to the purchaser of the product and may then make a claim against a government entity which distributes the rebate on behalf of the user. Note that this advantageously enables the user to be provided the government rebate automatically (e.g., without taking any overt action) regardless of which resource provider they purchased the product at. Using this system, the government rebate is applied directly to a payment account of the user that was used to complete the purchase. By way of a second illustrative example, the benefit provider 118 may be a tax reclamation provider that distributes tax reclamations to eligible (e.g., non-resident) parties for qualifying transactions. In this example, the benefit provider 118 may assess details of a transaction as well as details for a user in the transaction in order to ascertain an eligibility of the transaction for a reclamation claim (e.g., based on a non-resident being exempt from certain taxes that were paid in the transaction). Upon determining that the transaction qualifies for a reclamation benefit, the benefit provider 118 notifies the benefit processor 116 of the qualified amount and submits a claim to the benefit authority 120 (e.g., a tax authority in this example) on behalf of the user.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
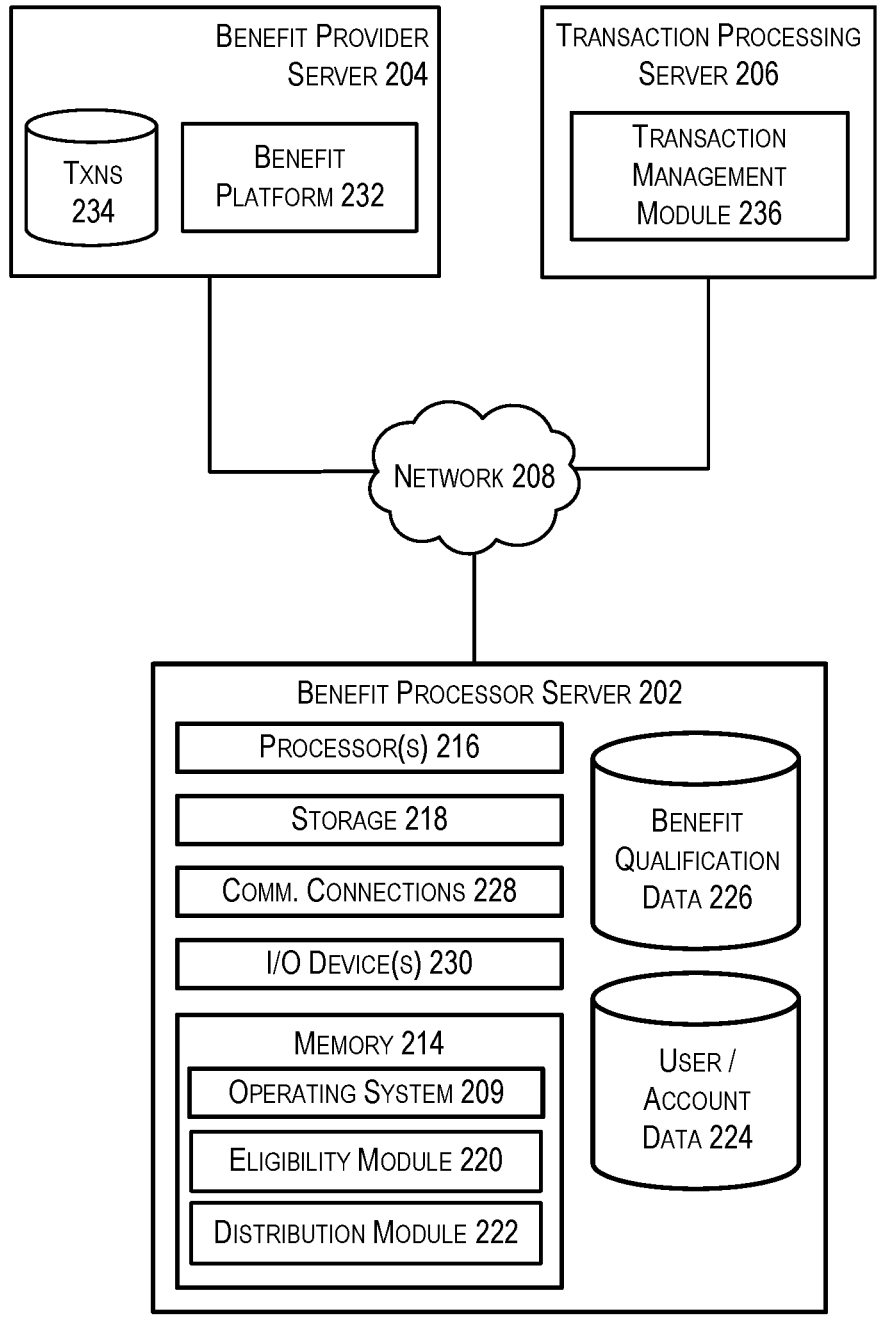
FIG. 2 depicts an example system architecture that may be implemented to facilitate automatic distribution of transaction-related benefits in accordance with embodiments of the disclosure.

FIG. 2 depicts an example system architecture that may be implemented to facilitate automatic distribution of transaction-related benefits in accordance with embodiments of the disclosure. The system architecture 200 is depicted as including a benefit processor server 202, which may be an example of benefit processor computer 116 depicted in FIG. 1. The benefit processor server 202 may be in communication with a benefit provider server 204 as well as a transaction processing server 206 via a network 208.

In at least some embodiments, the benefit processor server 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described. Additionally, it should be noted that in some embodiments, the benefit processor server 202 may be embodied by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

The memory 214 may store program instructions that are loadable and executable on the processor(s) 216, as well as data generated during the execution of these programs. Depending on the configuration and type of benefit processor server 202, the memory 214 may be volatile (such as random access memory (RAM)) and/or non-volatile (such as read-only memory (ROM), flash memory, etc.). The benefit processor server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 214 may include multiple different types of memory, such as static random access memory (SRAM), dynamic random access memory (DRAM) or ROM. Turning to the contents of the memory 214 in more detail, the memory 214 may include an operating system and one or more application programs or services for implementing the features disclosed herein including at least a module for determining eligibility of a transaction for benefits (eligibility determination module 220) and/or a module for distributing a qualifying benefit to the user of a transaction (distribution module 222). The memory 214 may also include account data 224, which provides data associated with one or more accounts, as well as benefit qualification data 226, which provides data indicating eligibility requirements for various benefits and/or products.

The memory 214 and the additional storage 218, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the benefit provider server 204, transaction processing server 206, the benefit processor server 202, or any other suitable computing device. The benefit processor server 202 may also contain a communication interface 228 that allow the benefit processor server 202 to communicate with a stored database, another computing device or server, user terminals, and/or other devices on the network(s) 208. The benefit processor server 202 may also include input/output (I/O) device(s) and/or ports 230, such as for enabling connection with a keyboard, a mouse, a pen, a voice input device, a touch input device, a display, speakers, a printer, etc.

Turning to the contents of the memory 214 in more detail, the memory 214 may include an operating system 209 and one or more application programs or services for implementing the features disclosed herein including at least an eligibility determination module 220 and/or a distribution module 222 as well as account data 224 and/or benefit qualification data 226. Stored data (e.g., account data 224 and/or benefit qualification data 226) may comprise any suitable persistent data storage system. In some embodiments, the data may be stored in a database. Information stored in a database may be accessed by the one or more modules via a database query or any other suitable data retrieval means.

In some embodiments, the eligibility determination module 220 may, in conjunction with the processor 216, be configured to identify transactions received by the transaction processing server 206 which qualify for benefit distribution. A benefit provider may provide qualification data to the benefit processor server 202 indicative of conditions that would qualify a transaction for a benefit to be distributed. For example, qualification data may include an indication of a product or product type that, when purchased, would entitle the purchaser to some benefit (e.g., a rebate, discount, etc.). Multiple benefit providers may provide qualification data, such that the benefit processor server 202 may maintain a mapping of qualification data to its corresponding benefit provider within benefit qualification data 226.

In certain embodiments, the eligibility determination module 220 may receive transaction details from a transaction processing server 206 as transactions (e.g., authorization request messages) are processed. More particularly, the eligibility determination module 220 may receive a number of product identifiers for one or more products associated with a transaction. In some embodiments, the transaction details are relayed to the eligibility determination module 220 by a distribution module 222. Upon receiving the number of product identifiers, the eligibility determination module 220 may determine if any of the products associated with the product identifiers qualify the transaction for a benefit distribution from benefit qualification data 226. Additionally, in some embodiments, the transaction details may include a payment account identifier which may be used to identify a user and/or account from user account data 224. This may give the eligibility determination module 220 access to demographic or other data for a user conducting the transaction. In some cases, the qualification data associated with a particular benefit may also include conditions which relate to attributes of the user. For example, only users living within a particular geographic region, or living outside of a particular geographic region, may qualify for the benefit. In another example, only users for which a level of income is below some threshold income level may qualify for the benefit. In embodiments in which qualification data associated with a particular benefit includes conditions which relate to attributes of the user, the eligibility determination module 220 may make that determination as well. Upon determining that a particular transaction meets each of the conditions set forth for a benefit in the benefit qualification data 226, the eligibility determination module 220 identifies a benefit provider server 204 responsible for distributing the benefit. The eligibility determination module 220 conveys this information to a distribution module 222.

In some embodiments, the distribution module 222 may, in conjunction with the processor 216, be configured to manage and distribute benefits. In some embodiments, the distribution module 222 receives full transaction details from a transaction processing server 206 as transactions are being conducted. The distribution module 222 then relays the transaction details to an eligibility module 220 which determines which, if any, benefits the transaction qualifies for. If the transaction does not qualify for any benefits, then the distribution module 222 may take no further action. However, if the distribution module 222 receives an indication that the transaction qualifies for one or more benefits (and a list of benefit provider servers 204 which distribute those benefits), then the distribution module 222 is further configured to provide limited transaction details for the transaction to each benefit provider server 204. The benefit provider server 204 may be determined using a routing table (not shown) that matches identifiers and addresses (e.g., IP addresses) of particular benefit provider servers to identifiers for different resource providers. In some embodiments, the limited transaction details may include sufficient information to identify the transaction without providing confidential information. For example, the limited transaction details may include two or more of: a resource provider identifier (e.g., a merchant id), a transaction date/time, the last four digits of a payment account, an authorization code, a transaction amount, etc. By providing limited transaction details, the benefit provider server 204 is able to initiate the benefit process for the user, without receiving or storing the user's actual account information.

In some embodiments, a user may be required to enroll for benefits prior to the transaction. For example, in the scenario in which the benefit is a tax reclamation, the user may need to provide passport and/or travel plans to the benefit processor before transactions will qualify for benefits. In this scenario, the distribution module 222 may only send transaction details for transactions associated with an enrolled user who is currently traveling to the eligibility determination module 220.

Additionally, the distribution module 222 may be further configured to initiate a distribution of a benefit to a payment account automatically. This may be done by the distribution module 222 upon receiving confirmation of benefit qualification and/or a benefit amount from the benefit provider server 204. To do this, the distribution module 222 may be configured to initiate a transfer of funds from an account associated with the benefit provider to the payment account used in the transaction.

In at least some embodiments, the benefit provider server 204 may include at least one server device configured to implement the features disclosed herein. Such a server device may execute an application or service (e.g., a benefit platform 232) that calculates benefit eligibility amounts and initiates benefit distribution as described herein. In some embodiments, the benefit provider server 204 may receive transaction data from a number of resource providers, which it may store in a database of aggregated transaction data 234. The transaction data received may include only a subset of the details of the transaction. For example, the benefit provider server 204 may receive an indication that a particular product was sold and a transaction number in which it was sold. In some cases, the benefit provider server 204 may receive serial numbers or other identifiers. It should be noted that the benefit provider server 204 may not be provided confidential information (e.g., payment details, etc.), and so may not otherwise have access to that data. When a benefit is distributed for a transaction, the transaction data 234 may be updated to reflect the distribution. Additionally, the benefit platform 232 may be further configured to file claims on behalf of the benefit distributed with a benefit authority (e.g., a government entity).

In at least some embodiments, the transaction processing server 206 may include at least one server device configured to implement the features disclosed herein. Such a server device may execute an application or service (e.g., a transaction management module 236) configured to route authorization request messages to an appropriate authorization entity server. Additionally, the transaction management module 236 may transmit a portion of each authorization request message to the benefit processor server 202. The portion of each authorization request message transmitted to the benefit processor server 202 may include at least identifiers for items involved in the transaction. Note that this may be done concurrently to the normal authorization process, and need not hold up that process. Additionally, upon receiving an indication of a benefit distribution (e.g., from the benefit processor server 202), the transaction management module 236 may be configured to settle a payment from an account associated with the benefit provider to an account associated with the portable device of the authorization request message on which the benefit is based.

Figure 3:
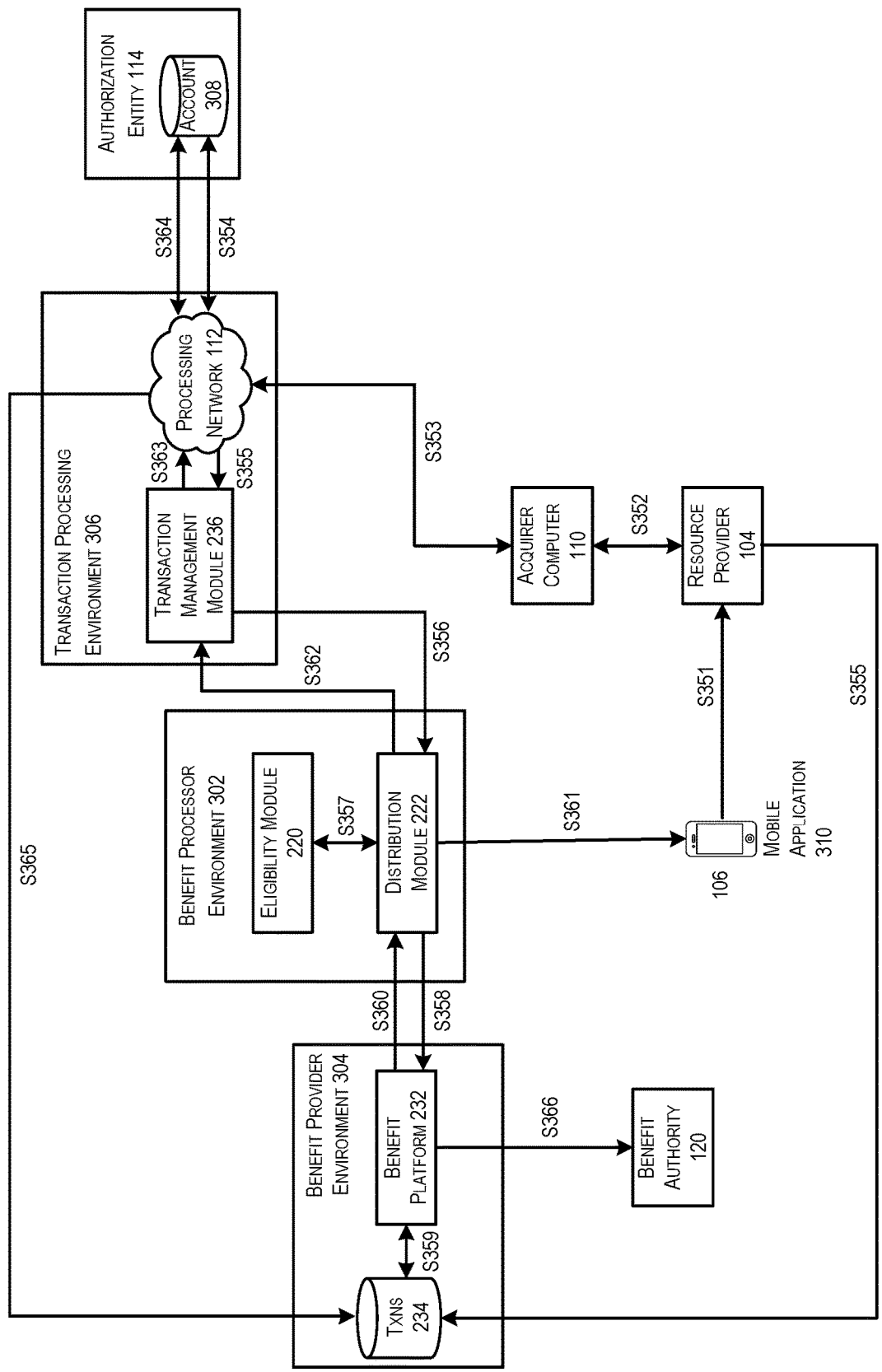
FIG. 3 depicts a process flow for providing automatic benefit distribution of transaction-related benefits in accordance with at least some embodiments.

FIG. 3 depicts a process flow for providing automatic benefit distribution of transaction-related benefits in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more processing devices configured with executable instructions and may be implemented as code (e.g., executable instructions, one or more computer programs or one or more applications). In accordance with at least one embodiment, the process 300 of FIG. 3 may be performed by at least the benefit processor server 202 depicted in FIG. 2. The code may be stored on a computer-readable storage medium, for example, in the form of a computer program including a plurality of instructions executable by one or more processors. The computer-readable storage medium may be non-transitory.

The process 300 of FIG. 3 is depicted as involving a number of interactions between various components, the various components having been described elsewhere. For example, the process 300 may involve interactions between a portable device 106, a resource provider computer 104, an acquirer computer 110, an authorization entity 114, a benefit processor environment 302 (which includes at least one benefit processor server 116), a benefit provider environment 304 (which includes at least one benefit provider server 118), and a transaction processing environment 306 (which includes a transaction processing network 112). In some embodiments, the process 300 may also involve interactions with a benefit authority 120.

Process 300 may begin at S351, when a transaction is conducted at a resource provider 104. In some embodiments, the transaction may involve a purchase made by a user using a payment account 308. For example, the resource provider 104 may be a merchant and a user may purchase one or more products from that merchant using a credit card. In order to complete the conducted transaction, the resource provider 104 conveys the transaction details to an acquirer computer 110 at S352. The acquirer computer 110 then forwards the transaction details to a processing network 112 of a transaction processing environment 306 at S353 (via an authorization request message). The transaction processing network 112, in turn, routes the transaction details to an authorization entity 114 which maintains the payment account 308 used to conduct the transaction at S354. The authorization entity 114 then determines whether to approve or decline the transaction based on details of the transaction and information stored in association with the payment account 308. Once a determination has been made by the authorization entity 114 as to whether to approve or decline the transaction, the authorization entity 114 provides an authorization response message back to the transaction processing network 112, which is then conveyed back to the acquirer computer 110 and ultimately the resource provider 104. The transaction is then completed.

In certain embodiments, in addition to performing the transaction described above, the resource provider 104 may also provide limited or full transaction details to a benefit provider environment 304 for transactions that it conducts at S355, which may be stored in a database of transaction data 234. In some embodiments, the resource provider 104 may provide transaction details to the benefit provider environment for every transaction that it conducts. In some embodiments, the resource provider 104 may only provide transaction details to the benefit provider environment 304 for transactions that involve particular products or product types. For example, the benefit provider may be a manufacturer of a particular product or product line. In this example, the resource provider 104 may report transaction details to the benefit provider for each of its product that the resource provider sells. As an illustration, in step S355, limited transaction details may include, for a single transaction, a resource provider identifier (e.g., merchant id), transaction date/time, the last four digits of a payment account, an authorization code, a transaction amount, and one or more product identifiers of products purchased by a user during the transaction. In this regard, the limited transaction details may be larger in number than the limited transaction details provided to the benefit provider environment 304 in step S358, which may be a subset of the transaction details provided to the benefit provider environment 304 in step S355.

In addition to, and in some cases concurrent to, routing transaction details to an authorization entity at S354, the processing network 112 may also trigger a payment authorization notification to a transaction management module 236 at S355. The transaction management module 236 may then provide at least a subset of the transaction details for the transaction to a benefit processor environment 302 at S356.

Upon receiving the transaction details, a distribution module 222 provides the transaction details to an eligibility module 220 at S357 to determine eligibility of the transaction for one or more benefits. Upon receiving the transaction details, the eligibility determination module 220 may determine if the transaction meets the conditions to qualify for a benefit. For example, the eligibility module 220 may determine if any products associated with product identifiers included in the transaction details qualify the transaction for a benefit distribution. In some embodiments, the eligibility module 220 may determine whether a user in the transaction meets conditions to be eligible for the benefit. For example, in a scenario in which a benefit is a tax reclamation (e.g., for VAT taxes) eligible transactions are limited to certain product types as well as to users who reside outside of a particular geographic region. The eligibility module 220 may maintain details relating to any number of benefits provided by any number of different benefit providers. For example, in a scenario in which a benefit is a tax reclamation, separate benefit providers may each be responsible for providing reclamation services in different geographic regions. In another example, each benefit provider may be associated with, or operated on behalf of, a different manufacturer of a product or product line (e.g., brand).

Upon determining that a transaction qualifies for a benefit, the eligibility module 220 may identify the benefit provider associated with the qualifying benefit to the distribution module 222. The benefit provider server 204 may be determined using a routing table (not shown) that matches identifiers and addresses (e.g., IP addresses) of particular benefit provider servers to identifiers for different resource providers. The distribution module 22 then forwards limited transaction data to the indicated benefit provider environment 304 at S358. In some embodiments, the limited transaction details may include a resource provider identifier (e.g., merchant id), transaction date/time, the last four digits of a payment account, an authorization code, a transaction amount, etc.

Upon receiving the limited transaction details from the distribution module 222, a benefit platform 232 within the benefit provider environment 304 may perform a lookup operation to obtain a record of the transaction at S359. This may involve identifying a transaction within transaction data 234 by matching the limited transaction data provided to data stored therein. The benefit provider may then make an independent eligibility decision for the transaction based on information stored in the transaction database 234 in relation to the conducted transaction. In some embodiments, the benefit provider may determine an amount to be associated with the benefit. For example, a benefit amount may be calculated as a percentage of the pre-tax amount paid in the transaction. The benefit platform 232 then provides a response to the distribution module 222 at S360. If the benefit platform 232 determines that the transaction is not eligible for a benefit distribution, the response provided as S360 may include a reason (e.g., a reason code). If the benefit platform 232 determines that the transaction is eligible for a benefit, then it may respond with an approval and/or amount of the benefit to be distributed.

Upon receiving an indication of a benefit/amount to be distributed, the distribution module 222 may be further configured to automatically initiate the distribution of the benefit to a payment account. This may be done by the distribution module 222 initiating a transfer of funds from an account associated with the benefit provider to the payment account used in the transaction. In some embodiments, an identifier for a payment account from which a benefit is to be distributed may be stored in relation to the benefit provider. In some embodiments, an identifier for a payment account from which a benefit is to be distributed may be provided to the benefit processor environment at step S360. Note that in the example provided, the benefit provider environment is not provided with the payment account details used to complete the transaction. This reduces the risk of exposing the user's payment account identifier to a potential data breach or man-in-the-middle attack, and subsequent fraudulent use of the user's payment account identifier. In some embodiments, the distribution module 222 may provide a notification to a portable device 106 associated with the payment account involved in the transaction at S361. The notification may indicate that the benefit is being dispersed. In some embodiments, the notification may be provided to the portable device 106 via a push notification to a mobile application installed upon the portable device 106.

To initiate the transfer of funds, the distribution module 222 may provide a debit adjustment notification to the transaction management module 236 at S362, which may forward the debit adjustment notification to the processing network 112 at 363 and subsequently to the authorization entity 114 at S364. The transaction management module 236 later settle the benefit distribution transaction by obtaining funds from the payment account associated with the benefit provider and transferring those funds to the payment account used to complete the transaction at the resource provider 104. However, in some embodiments, funds associated with the distributed benefit may be made available to the payment account immediately.

In some embodiments, the debit adjustment notification may be in the form of a credit transaction message may include a message that initiates a credit to an account. In some embodiments, the credit transaction message may be an Original Credit Transaction (OCT) message. An OCT (Original Credit Transaction) is typically a clearing and settlement credit transaction designed for use in business applications such as a business money transfer or business-to-user repayments. When used in embodiments of the present invention, the OCT transaction can be used to deliver funds to the target account. In some cases. It is separate from, and in some cases, can takes place after, an AFT transaction. The account of the user can be a credit or debit card account number, and it can be credited very quickly (almost in real time). A settlement process between the authorizing entity computer operated by the authorizing entity 114, and the benefit provider environment 304 may take place at a later time. In this regard, the benefit provider environment 304 may have an acquiring bank identification number (acquiring BIN) to allow such settlement to occur.

In some embodiments, once the benefit has been distributed to the payment account for the transaction, the processing network may provide a notification to the benefit provider at S365. The benefit provider may then update the transaction data 234 to indicate that the benefit has been distributed, which may prevent duplications of benefit distribution.

Additionally, in some embodiments, upon receiving an indication that a benefit has been successfully distributed to an account, the benefit provider may make a claim to a benefit authority 120 on behalf of the user in the transaction at S366. For example, if the benefit provider is a tax reclamation provider responsible for distributing tax reclamations on behalf of a regional government, then the benefit provider may make a claim to the tax authority to recoup the provided benefit.

Figure 4:
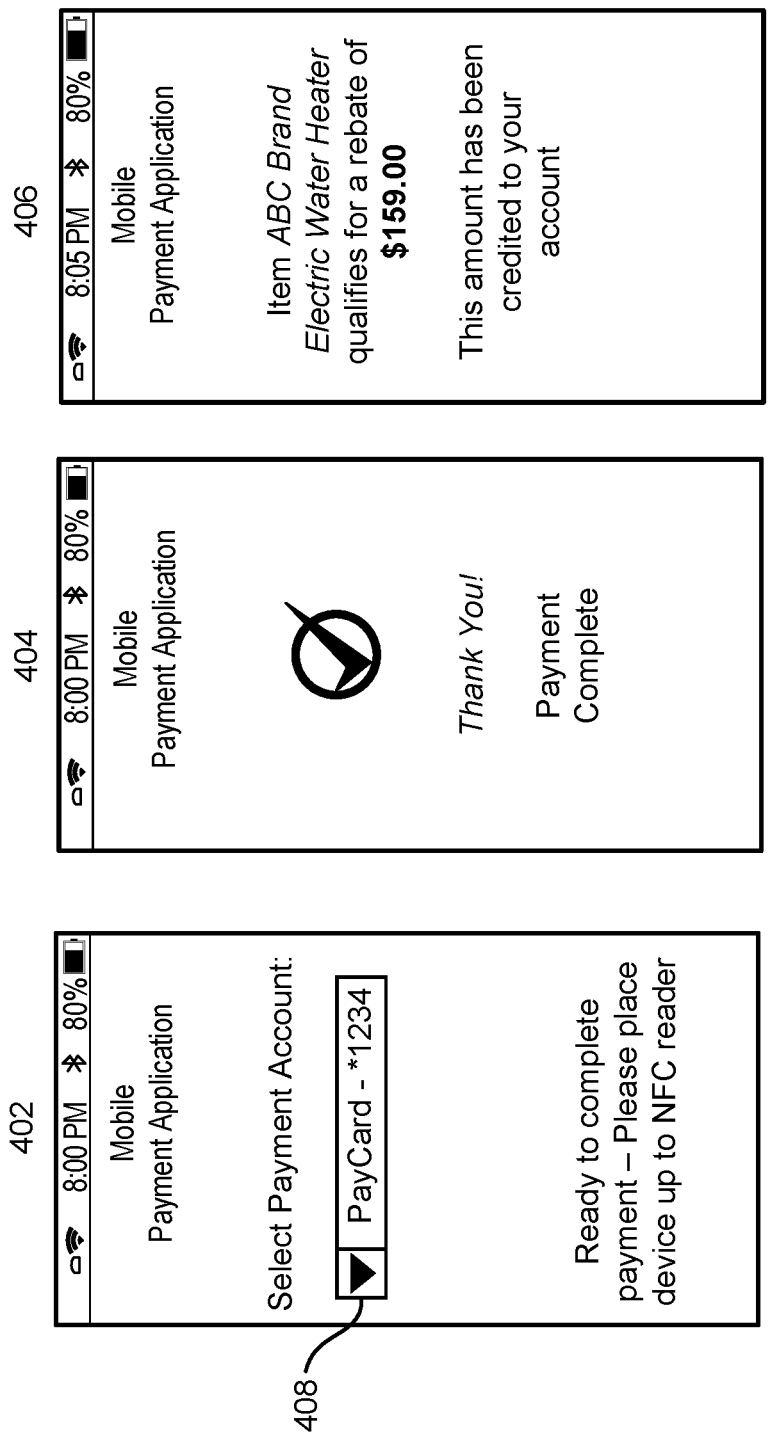
FIG. 4 depicts a first illustrative process for obtaining benefits in an automated benefit distribution system via a portable device in accordance with at least some embodiments.

FIG. 4 depicts a first illustrative process for obtaining benefits in an automated benefit distribution system via a portable device in accordance with at least some embodiments. The process 400 is depicted as a series of graphical user interfaces (GUIs) presented via a portable device (e.g., GUIs 402, 404, and 406), which may be an example of portable device 106 depicted in FIG. 1. In some embodiments, portions of process 400 may coincide with process 300 described above.

As depicted at 402, a user may elect to complete a payment for a transaction using a portable device. In this case, the portable device may be a smart phone or other suitable mobile device having a contactless transmitter/reader. Some embodiments may be implemented via a mobile application installed, and executed, upon a portable device. In some embodiments, a mobile application may require a user of the portable device to login by authenticating him/herself prior to providing the functionality described herein. The mobile application may be associated with, and maintained on behalf of, an authorization entity or other payment provider.

In some embodiments, the user may select a payment account to be used to complete a transaction. For example, a mobile application may store a number of payment account identifiers associated with a user and/or account in memory or may obtain a number of payment accounts from a remote server. The mobile application may then allow the user to select one of the payment accounts to be used to complete a transaction, such as via a dropdown menu 408. In some embodiments, the portable device may then be brought into proximity of a contactless transmitter/reader of a POS device. Upon being brought within communication range of the contactless/transmitter/reader, the portable device is provided a number of details for the transaction. The portable device may then generate a cryptogram from the provided number of details and may provide that cryptogram and the payment account to the contactless transmitter/reader of the POS device.

As depicted at 404, the mobile application may receive a notification upon completion of the transaction. In some embodiments, the notification may be provided to the mobile application by the POS device. In some embodiments, upon receiving an indication that the transaction has been authorized, the mobile application may receive a notification from a remote server in communication with a transaction processing network. Once the transaction has been authorized, any benefit for which the transaction qualifies is determined as described with respect to process 300 depicted in FIG. 3. The benefit is then distributed by being automatically credited to the payment account used to conduct the transaction at 402.

As depicted at 406, the mobile application may receive and present a notification of one or more benefits distributed in relation to the conducted transaction. For example, consider a scenario in which the transaction involves a purchase of an electric water heater from a retail store. In this example, the system may determine that the particular brand of electric water heater qualifies for a regional government-issued rebate being offered for the purchase of energy efficient devices. In this example, the system automatically submits the transaction to the benefit provider (e.g., a third party processing rebates on behalf of the regional government) on behalf of the user. The benefit provider then determines an amount that the transaction qualifies for and provides that information back to the system. Once the system receives confirmation that the transaction qualifies for the rebate, and the amount that the transaction qualifies for, the rebate is applied to the user's payment account (e.g., the payment account used to complete the transaction) automatically and a notification is provided to the user indicating the application of the rebate. Note in this example that the user need not take any overt action to obtain the rebate other than to conduct the transaction. Note also that the benefit is distributed regardless of the retailer at which the transaction is conducted, so the retailer need not be an active participant. Furthermore, by enabling distribution of a benefit in response to a transaction in the manner described, the system can prevent rebate fraud from receipt duplication.

Figure 5:
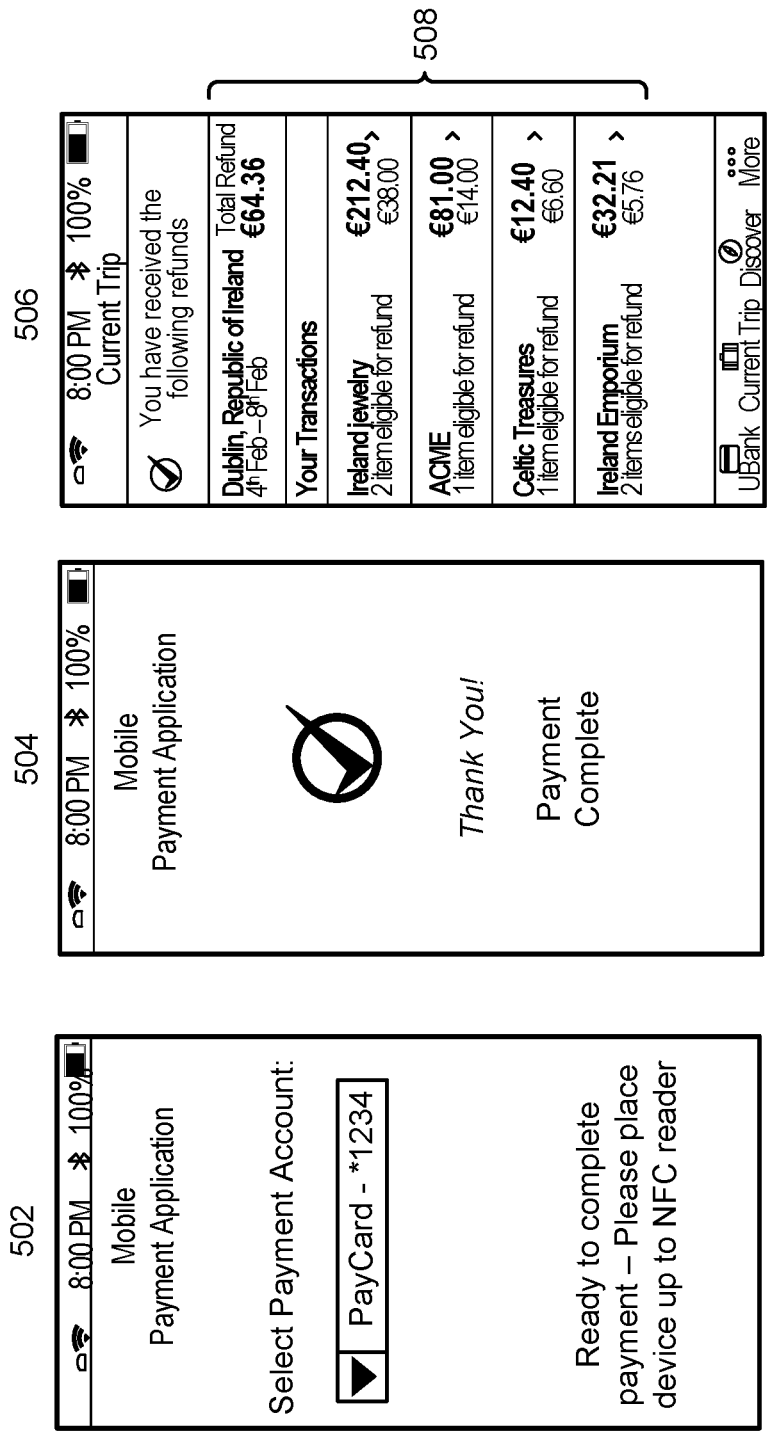
FIG. 5 depicts a second illustrative process for obtaining benefits in an automated benefit distribution system via a portable device in accordance with at least some embodiments.

FIG. 5 depicts a second illustrative process for obtaining benefits in an automated benefit distribution system via a portable device in accordance with at least some embodiments. The process 500 is depicted as a series of graphical user interfaces (GUIs) presented via a portable device (e.g., GUIs 502, 504, and 506), which may be an example of portable device 106 depicted in FIG. 1. In some embodiments, portions of process 500 may coincide with process 300 described above.

Similar to the example described in FIG. 4 above, a user may elect to complete a payment for a transaction using a portable device at 502 and a mobile application may receive a notification upon completion of the transaction at 504. However, as depicted at 506, the mobile application may provide and maintain a list of distributed benefits 508. For example, consider a scenario in which the transaction is conducted by a non-resident citizen and involves a payment of a tax for which the non-resident citizen is exempt. By way of illustration, United States citizens are exempt from paying value-added tax (VAT) in certain European countries on certain products and product types. Accordingly, when traveling through Europe, the US citizen may qualify for reclamation credits on various transactions that he or she conducts. Normally, this process involves a significant amount of action on the part of the non-resident citizen, and often involves collecting vouchers from a merchant for each transaction as well as actions to be taken at a customs station within an airport when departing the country. Once submitted, the reclamation process can take weeks to complete before any reclamation credit is issued (usually via a check in the mail).

In the scenario above when implemented on embodiments, the system automatically submits each transaction to a benefit provider (e.g., a third party processing reclamations on behalf of a local government) on behalf of the user. In some embodiments, a benefit provider may be selected based on the resource provider involved in the transaction. For example, each resource provider may be serviced by one of a number of available benefit provider. In this example, a benefit processor may maintain a mapping of resource providers to their respective benefit provider. The benefit provider then determines an amount that the transaction qualifies for and provides that information back to the system. Once the system receives confirmation that the transaction qualifies for the reclamation credit, and the amount that the transaction qualifies for, the reclamation credit is applied to the user's payment account (e.g., the payment account used to complete the transaction) automatically and aggregated reclamation credit information may be provided to the mobile application. Note in this example that the user need not take any overt action to obtain the reclamation credit other than to conduct the transaction. Note also that the retailer need not take any overt action (e.g., provide a transaction voucher) for the user to obtain the reclamation credit.

Figure 6:
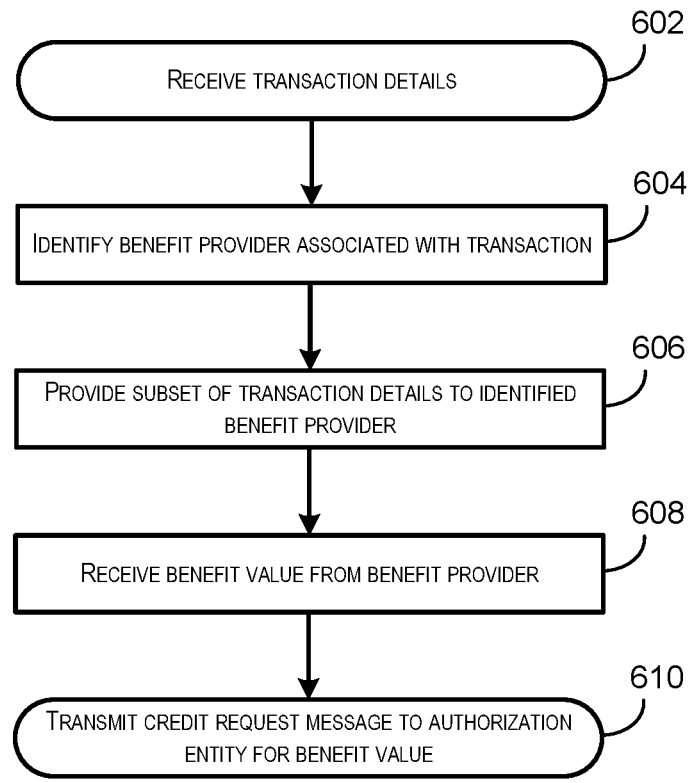
FIG. 6 depicts a flow diagram illustrating an example process for automatic distribution of a transaction-related benefit to a payment account used in the transaction in accordance with at least some embodiments.

FIG. 6 depicts a flow diagram illustrating an example process for automatic distribution of a transaction-related benefit to a payment account used in the transaction in accordance with at least some embodiments. The process 600 may be performed by a benefit processor computer, such as the benefit processor server 204 described with respect to FIG. 2.

Process 600 may begin at 602, when transaction details are received from a transaction processing network in relation to a transaction. The transaction details may be obtained by the transaction processing network from an authorization request message received from a resource provider in relation to a transaction conducted between the resource provider and a user. The authorization request message includes at least an indication of a payment account maintained by an authorization entity. The authorization request message may also include other transaction details, such as an identifier for the resource provider (e.g., a merchant id) identifiers for one or more products involved in the transaction, an amount of the transaction, or any other suitable transaction details.

At 604, the process 600 involves identifying a benefit provider associated with the transaction. In some embodiments, a benefit provider computer is operated on behalf of a manufacturer and the benefit is a rebate for goods manufactured by the manufacturer. In some embodiments, a benefit provider computer is operated on behalf of a tax reclamation provider and the benefit is a reimbursement of taxes paid by the user. In some embodiments, a benefit provider computer associated with the transaction is identified based on the resource provider. For example, each resource provider may be serviced by a particular benefit provider. In this example, the benefit processor computer may maintain a mapping of resource providers to each respective benefit provider. Once the transaction has been determined to be eligible for one or more benefits, benefit providers associated with the eligible benefits are identified. In some embodiments, a benefit provider computer associated with the transaction is identified based on one or more products involved in the transaction. For example, a benefit provider computer may be a manufacturer of a product or a rebate distribution manager for a rebate specific to the product.

Identifying a benefit provider associated with a transaction may involve determining eligibility of the transaction for each of a number of benefits by comparing transaction details to benefit qualification data provided with respect to each of the number of benefits. In some embodiments, eligibility for a benefit may also be determined based on information stored in association with the user in the transaction. For example, eligibility for a particular benefit may hinge upon the user's residence, net income, or other demographic data. In these embodiments, the benefit processor computer may retrieve user data stored in relation to the user in order to determine eligibility for the benefit.

In some embodiments, one or more benefit providers may independently receive limited transaction details from a resource provider, which may include non-sensitive data. Examples of such non-sensitive data may include a date/time of the transaction, a transaction identifier, an amount of the transaction, an amount for which a particular item was sold, an amount of taxes paid, etc. In some embodiments, the resource provider may provide a product identifier (e.g., a serial number) for a particular good that was sold by the resource provider. By way of example, a resource provider may notify a manufacturer of a good each time that one of its goods has been sold, which may enable the manufacturer to ship new product and/or maintain warranty information for the good. The limited transaction details for the transaction may be stored by the benefit provider computer within a database including limited transaction details for multiple transactions. In some embodiments, the multiple transactions may be associated with a plurality of different resource provider computers.

At 606, the process 600 involves providing a subset of transaction details to the identified benefit provider. The subset of transaction details may be restricted to only non-sensitive data. In some embodiments, the subset of the transaction details may include one or more of a resource provider identifier, a transaction date, a last four digits of the payment account, an authorization code, or a transaction amount. In some embodiments, a portable device used to complete the transaction is a sixteen digit payment token and the subset of transaction details includes the last four digits of the sixteen digit payment token. Upon receiving the subset of transaction details, the benefit provider identifies a transaction from a database of transaction data. To do this, the benefit provider computer may match the limited transaction details for the transaction received from the resource provider to the subset of the transaction details.

At 608, the process 600 involves receiving a value such as a benefit value from the benefit provider. In some embodiments, the benefit value is determined as a portion of an amount of the transaction. In some embodiments, the benefit value may be equal to a particular tax or fee included in the transaction. In some embodiments, the benefit value may be calculated using some algorithm known to the benefit provider.

At 610, the process 600 involves transmitting a credit request message to an authorization entity for the benefit value to an account used in the transaction. To credit the benefit value to the account, the transaction processing network may cause the authorization entity to credit the account and cause a second authorization entity to debit an account associated with the benefit provider computer each for an amount of the benefit value. An indication of the account associated with the benefit provider computer may be retrieved by the benefit processor computer and provided in the credit request message. The benefit value credited to the account associated with the portable device is drawn from the account associated with the benefit provider computer during a settlement process. In some embodiments, the benefit value is credited to the account associated with the portable device prior to the benefit processor server receiving funds corresponding to the benefit value from the account associated with the benefit provider computer. In the scenario in which a benefit provider computer is operated on behalf of a tax reclamation provider, and the benefit is a reimbursement of taxes paid by the user, the tax reclamation provider may subsequently submit a claim with a tax authority on behalf of the user.

In some embodiments, the benefit processor computer may additionally provide a notification to a portable device associated with the user that the benefit amount has been credited. In some embodiments, the benefit processor computer may maintain an account for a user as well as benefit data. The user may be able to log in to the account via a mobile application installed on his or her mobile device in order to be provided information stored in relation to that account. For example, the user may log into the account and be provided an aggregated list of benefits credited to the user.

In some embodiments, upon the benefit value being credited to the account associated with the transaction, a notification is provided to the benefit provider to cause it to update the limited transaction details stored in the transaction database to indicate that the benefit value has been redeemed. If the benefit provider subsequently receives transaction details that match a transaction for which the benefit value is indicated as having been redeemed, the benefit provider may return a benefit value of zero. For example, if the limited transaction details for a transaction that has been redeemed includes a unique product identifier (e.g., a serial number), and a second transaction is received that includes the same unique product identifier, then the benefit provider may return a benefit value of 0.

Embodiments of the disclosure provide for a number of advantages over conventional systems. For example, the system enables manufacturers of products or sponsoring entities (e.g., government entities) to provide an incentive for the purchase of a particular product or type of product without requiring merchant cooperation or overt user action (other than to make the purchase). Additionally, offering benefits through a benefit distribution system implemented in the manner described herein can prevent fraud, as users are not able to duplicate receipts in order to claim benefits for which they are not qualified. Benefit distribution is also made much more efficient, as benefits can be distributed within mere minutes as opposed to days or even weeks in prior systems.

Additionally, when implemented in a tax reclamation system (e.g., to reclaim VAT taxes for a non-resident), there is no requirement that the user obtain a voucher at the time of the transaction or that the merchant provide one. Instead, the reclamation credit can be distributed to the user almost immediately and without any additional effort on the part of the user. This may also incentivize users to conduct more transactions while abroad.

Furthermore, the system described herein is advantageous over other systems in that benefits may be delivered directly to an account linked to the request without actually providing that account to the benefit provider. In a tax reclaim scenario, this means that the user does not need to share payment account details with a tax reclaim processor (i.e., a reclamation authority) at the airport and further reduces cash handling charges for the processor, as they do not need to provide the refund as cash. Note that the benefit provider is not provided payment account details in embodiments, resulting in a more secure means of distributing benefits.

In certain embodiments of the system described herein, a user need not present any benefit information (e.g., a coupon) at the time of purchase. Instead, when the user uses his or her payment card to complete a transaction at a merchant, a processor for the payment card automatically initiates the benefit distribution process. To do this, the payment processor, upon identifying a potentially eligible transaction, determines the appropriate benefit provider based on details of the transaction. The payment processor then provides some details to that benefit provider which can be used to identify the transaction from a list of saved transaction data. However, to preserve privacy and improve data security, the details provided may not be sufficient to identify the payment information (e.g., PAN or token) used in completing the transaction, which limits exposure of risk for the user. The benefit provider then determines the eligibility of the transaction and provides that information to the payment processor. Once that has been done, the payment processor can credit the benefit amount to the user (usually within 30 minutes from the time of the transaction). In some embodiments, the payment processor essentially "loans" the benefit amount to the cardholder, which is then repaid upon settlement with the benefit provider. This enables the benefit to be provided extremely rapidly. Also, the benefit provider is never in possession of the PAN or token, so the user is never at risk of compromise by the benefit provider.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, at a benefit processor server, transaction details related to a transaction conducted at a resource provider computer using a portable device of a user, the resource provider computer being operated by a resource provider, the transaction details including resource provider information, transaction identifying information, and a product identifier that identifies a product involved in the transaction;
identifying, by the benefit processor server, a benefit provider computer associated with the transaction based on at least the resource provider information, wherein the benefit provider computer independently receives limited transaction details for the transaction from the resource provider computer and stores the limited transaction details within a plurality of transaction data corresponding to a plurality of transactions in a database of the benefit provider computer, the limited transaction details including at least two from among the resource provider information, the transaction identifying information, and the product identifier;

providing, by the benefit processor server to the benefit provider computer, a subset of transaction details for the transaction, wherein the subset of limited transaction details is used by the benefit provider computer to identify the transaction by comparing the subset of transaction details to the plurality of transaction data and matching the subset of transaction details to the limited transaction details, wherein the subset of transaction details includes at least two from among the resource provider information, the transaction identifying information, and the product identifier;

receiving, by the benefit processor server from the benefit provider computer, an indication of a value of a benefit associated with the transaction; and transmitting, by the benefit processor server, a credit request message to an authorization entity computer to credit the value to an account associated with the portable device, wherein the crediting the value causes the benefit provider computer to update the limited transaction details in the database to indicate that the benefit associated with the product identifier has been redeemed.

2. The method of claim 1, wherein the benefit is credited to the account associated with the portable device prior to the benefit processor server receiving funds corresponding to the value from an account associated with the benefit provider computer.

3. The method of claim 1, wherein the portable device comprises a sixteen digit token and wherein the subset of transaction details includes at least last four digits of the sixteen digit token.

4. The method of claim 1, wherein the plurality of transactions are associated with a plurality of different resource provider computers.

5. The method of claim 1, wherein the benefit provider computer associated with the transaction is identified based on an identifier for the resource provider.

6. The method of claim 1, wherein the benefit provider computer associated with the transaction is identified further based on the product involved in the transaction.

7. The method of claim 1, wherein the value is determined by the benefit provider computer as a portion of an amount for the transaction.

8. The method of claim 1, wherein the value credited to the account associated with the portable device is drawn from an account associated with the benefit provider computer.

9. The method of claim 1, wherein the benefit processor server stores a routing table which is capable of identifying the benefit provider computer using an identifier for the resource provider.

10. A benefit processor server comprising:
a processor; and
a memory including instructions that, when executed by the processor, cause the benefit processor server to, at least:
receive transaction details related to a transaction conducted at a resource provider computer using a portable device of a user, the resource provider computer being operated by a resource provider, the transaction details including resource provider information, transaction identifying information, and a product identifier that identifies a product involved in the transaction;
identify a benefit provider computer associated with the transaction based on at least the resource provider information, wherein the benefit provider computer independently receives limited transaction details for the transaction from the resource provider computer and stores the limited transaction details within a plurality of transaction data corresponding to a plurality of transactions in a database of the benefit provider computer, the limited transaction details including at least two from among the resource provider information, the transaction identifying information, and the product identifier;
provide, to the benefit provider computer, a subset of transaction details for the transaction, wherein the subset of transaction details is used by the benefit provider computer to identify the transaction by comparing the subset of transaction details to the plurality of transaction data and matching the subset of transaction details to the limited transaction details, wherein the subset of transaction details includes at least two from among the resource provider information, the transaction identifying information, and the product identifier;
receive, from the benefit provider computer, an indication of a value of a benefit associated with the transaction; and
transmit a credit request message to an authorization entity computer to credit the value to an account associated with the portable device,
wherein the crediting the value causes the benefit provider computer to update the limited transaction details in the database to indicate that the benefit associated with the product identifier has been redeemed.

11. The benefit processor server of claim 10, wherein the resource provider information comprises a resource provider identifier, and
the transaction identifying information comprises at least one from among a transaction date, a last four digits of the account, an authorization code, and a transaction amount.

12. The benefit processor server of claim 10, wherein the value of the benefit is indicated to be zero if the benefit has already been processed for the product identifier.

13. The benefit processor server of claim 10, wherein the benefit provider computer associated with the transaction is determined based at least in part on information stored in association with an owner of the account.

14. A benefit provider server comprising:
a processor; and
a memory including instructions that, when executed by the processor, cause the benefit provider server to, at least:
receive, from one or more resource provider computers, limited transaction details related to a plurality of transactions conducted by the one or more resource provider computers, wherein for each of the plurality of transactions, the limited transaction details include at least two from among resource provider information of a corresponding resource provider operating a corresponding resource provider computer, transaction identifying information, and a product identifier;

receive, from a benefit processor server, a subset of transaction details related to a first transaction conducted by a first resource provider computer using a portable device of a user among the one or more resource provider computers, wherein the subset of transaction details includes information with respect to the first transaction, the information including at least two from among resource provider information associated with a resource provider operating the first resource provider computer, transaction identifying information, and a product identifier;

identify, by matching the subset of transaction details to the limited transaction detail, the first transaction among the plurality of transactions;

determine, based at least in part on the limited transaction details stored for the first transaction, a value for a benefit to be associated with the first transaction;

provide, to the benefit processor server, the value for the benefit, wherein the benefit processor server thereafter transmits a credit request message to an authorization entity computer to credit the value to an account associated with the portable device of the user; and upon crediting the value to the portable device, update the limited transaction details to indicate that the benefit associated with the product identifier has been redeemed.

15. The benefit provider server of claim 14, wherein the benefit provider server is operated on behalf of a manufacturer and the benefit is a rebate for goods manufactured by the manufacturer.

16. The benefit provider server of claim 14, wherein the benefit provider server is operated on behalf of a tax reclamation provider and the benefit is a reimbursement of taxes paid by the user.

17. The benefit provider server of claim 16, wherein the instructions further cause the benefit provider server to submit a claim with a tax authority on behalf of the user.

18. The method of claim 1, further comprising:
receiving, by the benefit processor server, a tax identification information for the user; and
determining, by the benefit processor server, that the transaction qualifies for the benefit based on the tax identification information,
wherein the benefit provider computer is operated on behalf of a tax reclamation provider, and
wherein the value of the benefit is a tax reimbursement for taxes paid by the user that is credited to the account associated with the portable device prior to the benefit processor server receiving funds corresponding to the tax reimbursement from the tax reclamation provider.

19. The method of claim 18, wherein, subsequent to the crediting the tax reimbursement to the account associated with the portable device, the benefit provider computer submits a claim to a tax authority on behalf of the user.

* * * * *

UNITED STATES PATENT AND TRADEMARK OFFICE
CERTIFICATE OF CORRECTION

| | |
|---|---|
| PATENT NO. | : 11,854,039 B2 |
| APPLICATION NO. | : 17/909889 |
| DATED | : December 26, 2023 |
| INVENTOR(S) | : Ranjiva Prasad, Jake Butler and Nidhi Kapoor |

It is certified that error appears in the above-identified patent and that said Letters Patent is hereby corrected as shown below:

In the Claims

In Claim 1, Column 21, Lines 11-12, please remove "wherein the subset of limited transaction" and insert -- wherein the subset of transaction --

In Claim 14, Column 23, Line 14, please remove "the limited transaction detail, the" and insert -- the limited transaction details, the --

Signed and Sealed this
Nineteenth Day of March, 2024

Katherine Kelly Vidal
*Director of the United States Patent and Trademark Office*